United States Patent [19]

Sääksjärvi et al.

[11] Patent Number: 4,583,167
[45] Date of Patent: Apr. 15, 1986

[54] PROCEDURE AND APPARATUS FOR CONVEYING EXTERNAL AND OUTPUT DATA TO A PROCESSOR SYSTEM

[75] Inventors: Paavo Sääksjärvi, Kirkkonummi; Lauri Lamberg, Helsinki, both of Finland

[73] Assignee: Elevator GmbH, Baar, Switzerland

[21] Appl. No.: 617,148

[22] Filed: Jun. 5, 1984

Related U.S. Application Data

[63] Continuation of Ser. No. 276,935, Jun. 24, 1981, abandoned.

[51] Int. Cl.⁴ .............................................. G06F 13/38
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,162,536 | 7/1979 | Morley | 364/200 X |
| 4,172,283 | 10/1979 | Kober | 364/200 |
| 4,181,936 | 1/1980 | Kober | 364/200 |

Primary Examiner—Thomas M. Heckler

[57] ABSTRACT

Procedure and apparatus for conveying the input and output data of a process or of other computer-controlled apparatus or equipment to a processor system comprising one or several central units with memories. The input and output data (I/O) are separated from the central units by means of I/O memories and the data transfer between the input and output data matching unit or interface and the I/O memories is performed by an I/O copier.

13 Claims, 5 Drawing Figures

PROCEDURE AND APPARATUS FOR CONVEYING EXTERNAL AND OUTPUT DATA TO A PROCESSOR SYSTEM

This application is a continuation of application Ser. No. 276,935 filed June 24, 1981, abandoned.

BACKGROUND OF THE INVENTION

The present invention concerns a procedure for conveying to a processor system the input and output data of a process or of other computer-controlled pieces of apparatus or installations, said system comprising one or several central units with memories.

In numerous control systems employing computers, as may be found in industrial processes as well as in complex equipment, such as cranes or other installations, it is advisable to distribute various tasks among different central units. It is similarly advantageous to subdivide various controls of portions of apparatus of or entire apparatus. Such subdivison simplifies programability and provides a simpler system which is easy to service and to modify. In the interest of clarity, it is desirable to specify precisely the terms "computer", "central unit" and "processor" from the viewpoint of the present invention. A computer is understood to be an entity composed of one or several central units with ancillary equipment and the central unit, again, consists of one or several processors with ancillary equipment. In the control systems mentioned, frequently two or more central units need the same input and output data from a processor, or data describing the state of the apparatus at a given time. For instance, the state of a single limit switch may be needed by one or several central units so that control can be properly managed.

In the prior art, this problem in control systems has been solved, either by connecting all requisite input and output data directly to all central units needing them or by connecting the central units together by means of some kind of data transfer bus, or even by using a separate input/output processor (to be referred to in abreviation, as I/O processor in the following), by which all central units receive all the data which they need. All these arrangements have their own drawbacks, however: when the input and output data are directly connected to all central units, it becomes necessary to construct for all of them similar input and output circuits. This increases the manufacturing costs and renders the circuitry complex. If each input and output datum is connected to only one central unit and a data transfer bus is used, these costs may be reduced, but now arises the problem of the interfacing between central units, the costs thereby incurred, and often also the slow operation caused by the bus. On the other hand when an I/O processor is used, there appear as extra costs those of the I/O processor itself, and the problem is then the interfacing of the central units and the I/O processor to attain the higher speed of operation which the I/O processor permits when there are several central units. For taking care of such interfacing, DMA (Direct Memory Access) technique or the traditional I/O technique has been used.

SUMMARY OF THE INVENTION

The purpose with the procedure and apparatus of the invention is to eliminate all the above-mentioned drawbacks and to provide a reliable control system, and one which is inexpensive in its manufacturing costs, for processes and for complex apparatus. The procedure of the invention is characterized in that the input and output data are separated from the central units by I/O memories and that the data transfer between the input and output data matching unit, or interface, and the I/O memories is carried out by an I/O copier. The advantage is then that the I/O bus does not burden the central units thereto connected, and that the number of central units that can be connected to one bus is only limited by the electrical loading capacity of the bus. It is a further advantage that the input and output circuits need not be replicated. All these favourable features make possible the outcome that the manufacturing costs of an installation carrying out the procedure will be low.

An advantageous feature of the invention is characterized in that the I/O copier copies the data from an input multiplexer to the input memory section of each central unit simultaneously and that it copies the output block of each central unit both to the output memories and to the equivalent block of the other central units simultaneously. The advantage is then that the synchronisation of the data processing processes performed by the central units is facilitated because the I/O copier simultaneously updates the data in all I/O memories.

Another feature of the invention is that the I/O copier performs data transmission without interruption while the system is in operation. This affords the advantage, among other things, that an inversion of state of an output signal due to a disturbance will be automatically corrected.

A further feature of the invention is that the updating of the input data to the I/O memories and the updating of output data from the I/O memories is accomplished completely without burdening the central units. This affords above all the advantage that one central unit may have a plurality of I/O buses, and these buses impose no load on it.

Still another favourable aspect of the invention is that the data transfer between the I/O memories and the matching unit, or interface, is accomplished in serial format with a word or block of data having 1 . . . n bits.

Still another favourable aspect of the invention is that the addressing of data in the copying event is executed for the I/O memories and the matching unit with the aid of separate address counters which are synchronized by the I/O copier. The advantage common to these two embodiments is that the I/O bus can be kept simple because no address data need be transmitted therein. Moreover, as a result of the simple bus and of its relatively low transmission rate (serial transmission), the bus and the central units thereto connected may be fabricated individually with comparative ease, thus reducing the manufacturing costs.

Still another favourable embodiment of the invention is characterized in that the timing of the interfacing circuitry is separate from the timing of the central units. The advantage is then gained that the I/O bus is resistant to crosstalk from other signal-carrying lines because fairly slow signals may be transmitted on the I/O bus.

The invention also concerns apparatus for carrying out the procedure mentioned above. The apparatus comprises one or several central units with memories, and an input and output data matching unit, or interface. The apparatus of the invention is characterized in that a simpler I/O memory has been connected to the I/O bus after the matching unit for each central unit which memory is connected by a local bus further to the central unit. Also, the copier transmitting both input and output data has been connected to the same bus with the matching unit and the I/O memories. The advantage is then gained that the I/O bus imposes no load on the central units connected thereto. It is a further advantage that the central units can read all inputs and write to all outputs by normal memory reading and writing operations. Furthermore, the central units may also read the states of all outputs from the I/O memories. A further advantage is the low price of the apparatus. For instance, the simple I/O copier which is employed is substantially more advantageous than the commonly used, more complex I/O processors.

BRIEF DESCRIPTION OF THE DRAWINGS

In the following, the procedure of the invention and the operation of the apparatus of the invention shall be described in greater detail with the aid of an example, with reference being made to the attached drawings, wherein.

DESCRIPTION OF THE PREFERRED EMBODIMENTS

Figure 1:
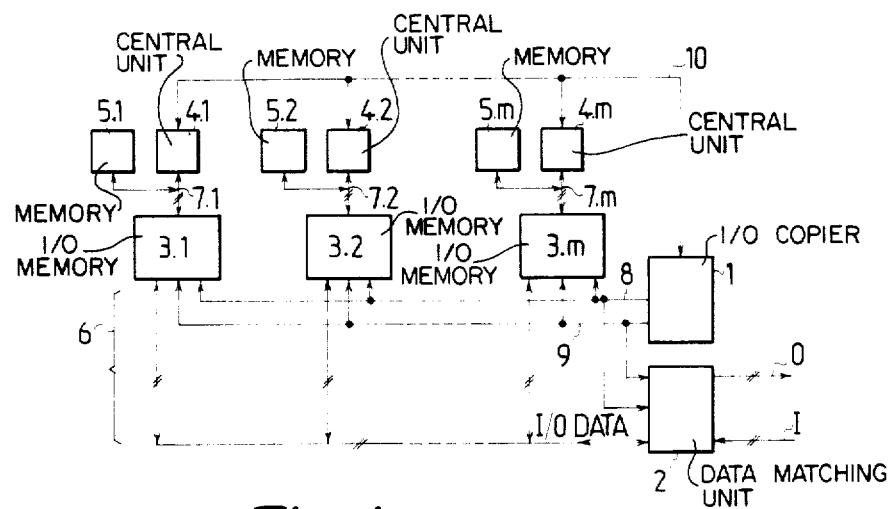
FIG. 1 presents the circuit of the invention, as a block diagram.

In the circuit of the invention is used an exceedingly simple I/O processor, which is here called the I/O copier 1, and which conveys the data from the inputs and outputs between the I/O memories 3.1, 3.2 . . . 3.m and the input and output data matching units, or interface, 2. The data transfer takes place along a common I/O bus 6 between all central units 4.1, 4.2 . . . 4.m which have memories 5.1, 5.2 . . . 5.m respectively, and the input and output data matching unit 2. The interfacing from the I/O bus to the central units has been made by mediation of each central unit's 4.1, 4.2 . . . 4.m own so-called I/O memory 3.1, 3.2 . . . 3.m respectively, this again being connected to its central unit by a local bus 7.1, 7.2 . . . 7.m respectively. The I/O bus is driven at a frequency so slow, and synchronized with the central units, that the use of the central unit's I/O memory has no effect on the operation of the I/O bus 6. The central units may consist of different circuits, such as circuits 8085 and 8088 manufactured by Intel.

Figure 2:
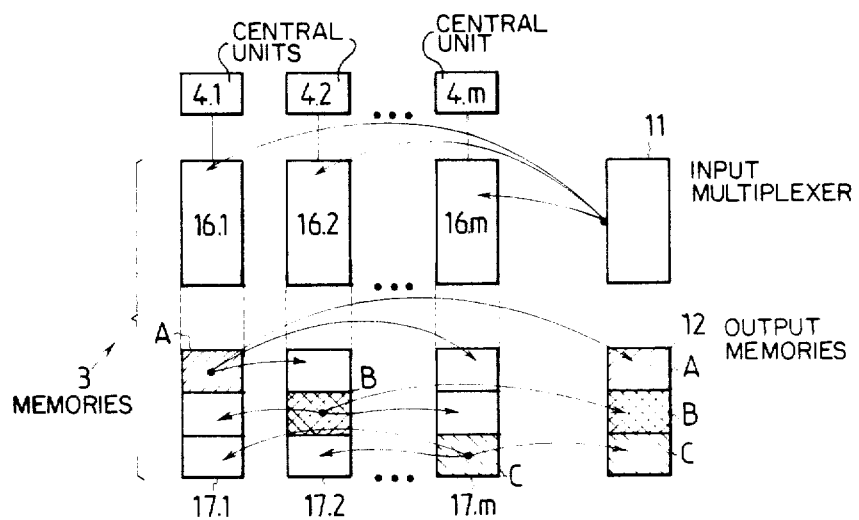
FIG. 2 illustrates the copying event accomplished by the I/O copier.

The I/O copier 1 continuously copies inputs to the I/O memories and outputs from the I/O memories 3.1, 3.2 . . . 3.m. In other words, the I/O copier continuously runs through the same loop. The copying event itself is illustrated by FIG. 2, and the I/O copier 1, not visible in the figure, copies all input data one word at a time simultaneously from the input multiplexer 11 to the I/O memories 3.1, 3.2 . . . 3.m of all central units 4.1, 4.2 . . . 4.m, more specifically to their input memory section 16.1, 16.2 . . . 16.m respectively. One word comprises 1 . . . n bits, with n a positive integer. All central units (4) have I/O memories and receive the data of all inputs simultaneously in their I/O memories. The output memory sections 17.1, 17.2 . . . 17.m of the I/O memories and the output memory sections 12 of the input and output data matching unit 2 have been divided, in FIG. 2, into blocks according to output group, and each such block may comprise 1 . . . n words. The number of blocks is not dependent on the number of central units or of input data, but it is not sensible in practice to make the number of blocks greater than that of the central units. The blocks, or output groups, have been differently hatched in FIG. 2 for greater clarity.

The blocks indicated by the hatching A represent output groups to which e.g. the central unit 4.1 is permitted to write; while those indicated by the hatching B may be written to by the central unit 4.2; and the central unit 4.m may write to those indicated with the hatching C. From all blocks of their own I/O memory, all central units 4.1 . . . 4.m are allowed to read. If each word that is going out, comprising 1 . . . n bits, or each output group, comprising 1 . . . n words, is being updated by several central units (4), the formatting of output data may be selected based on the electrical logics used. Thus each central unit has its own, preselected output group. The I/O copier copies the outputs, one word at a time, to the output memories 12 of each output group and to the output section (17) of the I/O memories in all other central units, to the equivalent location simultaneously. In other words, the outputs of one central unit are the inputs to the others. All other central units thus receive simultaneously information concerning the states of the outputs.

The central unit 4.1 for instance may read and write to the I/O memory 3.1, to its own permitted areas, at any time. Thus the central unit 4.1 is not compelled to wait for data from the bus 6, nor for the becoming free of the respective bus, as is the case in all other solutions known in the art. In order that the I/O memory 3.1 might not be able to hook into the bus of two different "pieces of apparatus"—in the present instance of the central unit 4.2 for instance and the I/O bus 6—when it is in use, the operation of the bus 6 and the central unit has to be so synchronized that their addressing changes cannot occur simultaneously. Since the bus 6 is common to all central units, these all have to be synchronized with the bus 6. The synchronizing may be carried out e.g. by the central units 4.1, 4.2 . . . 4.m and the I/O copier 1 being driven with the same clock signal 8 and by using different edges of the clock pulse for changing of addressing. Again, in order that the I/O circuits, or the input and output data circuits (I,O), and the addressing of the I/O memories 3.1, 3.2 . . . 3.m on the side towards the bus 6 might be kept in step with each other, they have to be synchronized. This could be managed in that the I/O copier 1 would create addresses for them all simultaneously, but in order that the bus 6 could be kept narrow, each I/O memory and I/O circuit generates its address itself, and the I/O copier 1 keeps the address counters 18,13 in step by generating for them all a common clock signal 8 and furthermore for start-up situations and for making sure of synchronizing, it generates for all a common synchronizing signal 9. In order that the manipulation of the I/O memory 3.1 for instance of the central unit 4.1 might not be visible on the bus 6, or vice versa, the timing of their read or write events has been managed so that one—as a rule the bus—is slower than the other to such degree that the other may interrupt its read or write operation and perform its own read or write operation in a manner such that it is not "visible" at all to that which is slower. For instance, if the memory period of the central unit is 1/10 of the memory period of the bus, this interruption of 1/10 in the period of the bus will have no effect on the operation of the bus.

Figure 3:
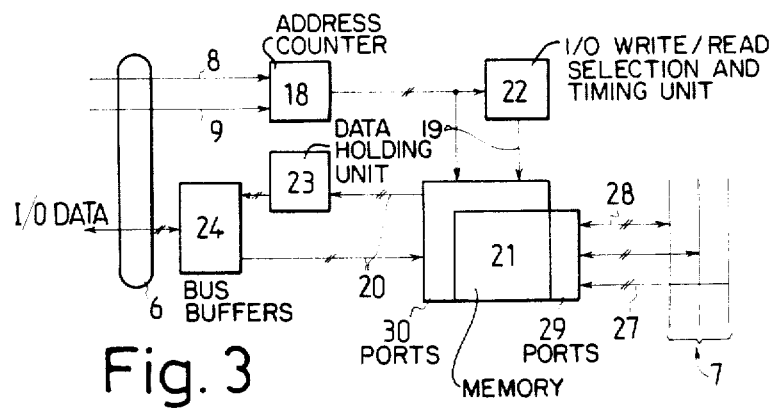
FIG. 3 shows the I/O memory with its ancillary circuits, as a block diagram.
Figure 4:
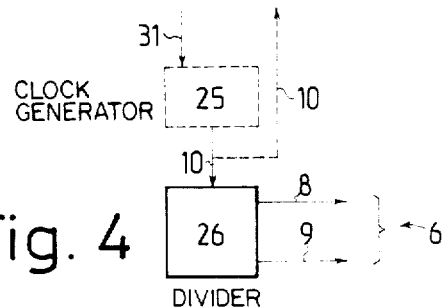
FIG. 4 shows the I/O copier with its ancillary circuits.

FIG. 3 displays the construction of an I/O memory and its connection to the rest of the system, in a block diagram. The diagram shows RAM type memory 21 with double ports both on the address lines 19,27 and the data lines 20,28. Through one set of ports 29, the central unit 1 reads the memory or writes thereto, and through the other set of ports 30 the memory communicates with the I/O bus 6 and the address counter 18. Only when the central unit wishes to use the memory are the ports coupled to the bus 7 active. The address counter 18 counts the address 21 in the step of the clock signal 8 coming to the memory 21 from the bus 6. The address has been connected to the memory 21 through the ports 30, which are active at all times other than those when the central unit desires to use the memory 21. The counter 18 is synchronized with the respective address counters of the other I/O memories by the synchronizing signal 9. The unit 22 may be called the I/O write/read selection and timing unit, and is constructed of logic circuity by which the input and output areas are selected from the memory 21. The unit 22 generates the read or write signals and performs the timing of these and of the addresses. The outgoing data holding unit 23 takes care that the data remains unchanged on the bus 6 in case the central unit desires to use the RAM memory while writing to the bus 6 is in progress. The bus buffers 24 are circuits which match the RAM memory 21 to the I/O bus 6 to be electrically matched.

The central units 4.1, 4.2 . . . 4.m to be connected to the bus 6 and the copying event must be synchronisable so that the changes of state of the address counters 18 of the I/O memories 3 of the central units 4.1, 4.2 . . . 4.m will not occur at the same time. Therefore the central units have to be mutually synchronized so that there are such time intervals during which no changes take place in that bus 7 of the central unit on which it addresses the I/O memory and in which time intervals the changes of the address counters 18 are effected, that is the moments of change of the signal 8. This is taken care of by the I/O copier's synchronous clock generator 25, which may also be replaced with the clock pulse 31 of any one central unit 4 and by which all other central units and the I/O copier 1 are synchronized. The I/O copier 1 also comprises the divider 26, which is a simple counter dividing from the synchronous clock pulse 10 a clock pulse 8 of suitable frequency to the I/O bus 6, and generates at predetermined intervals the I/O synchronizing signal 9 by which the address counters 18 of all RAM memories 21 are synchronized. For instance, when the RAM memory 21 has been run through once, the I/O synchronizing signal 9 may be a mere zeroing pulse for the address counters 18. The maximum frequency of the clock pulse 8 is determined by the clock frequency of the central units 4.1, 4.2 . . . 4.m and by the length of their memory periods.

Figure 5:
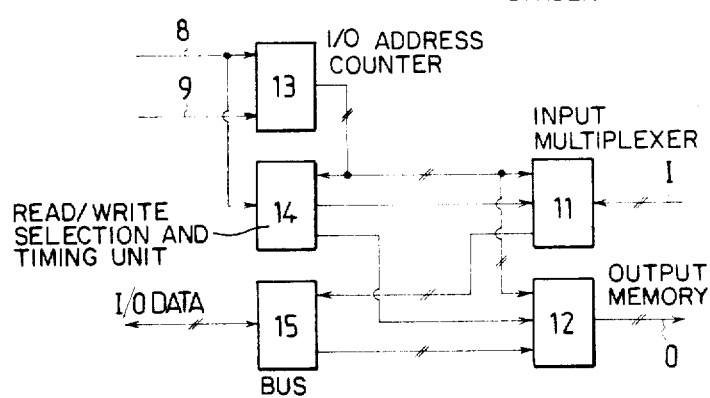
FIG. 5 shows the input and output data matching unit, or interface, and its circuit, as a block diagram.

FIG. 5 illustrates the construction of the input and output data matching unit 2 and its connection with the rest of the system, in a block diagram. Herein, the I/O address counter 13 counts addresses to the input multiplexer 11 and to the output memory section 12 in step with the clock pulse 8 coming from the bus 6. With the aid of the I/O synchronizing signal 9, the address counter 13 is synchronized with the address counters 18 of the I/O memories 3.1, 3.2 . . . 3.m. The unit 14 is the read/write selection and timing unit. It is a logics unit which selects the read or write operation and generates the requisite read and write pulses. The input multiplexer 11 is controlled both by the address counter 13 and by the read pulses. The output memory section 12, again, contains the addressable memories which are controlled by the address counters 13 and the write pulses, and finally the bus buffers 15 are circuits which electrically match the inputs and outputs to the I/O bus 6.

It is obvious to a person skilled in the art that the invention is not exclusively confined to the example related above, and that rather its embodiments may vary within the scope of the claims presented hereinafter.

We claim:

1. A method of communicating input and output data with a data processor system comprising at least one central unit with a local memory, at least one I/O memory wherein each I/O memory connects with a corresponding central unit, a single matching unit for coupling input and output data between said system and a site external thereto, a data bus connecting said matching unit with each I/O memory, and an I/O copier providing timing signals to said matching unit and to each I/O memory, and wherein each of said I/O memories includes address generation means for providing addresses for data in response to said copier timing signals, said method comprising:

storing input and output data for each central unit in the separate ones of said I/O memories, thereby separating the input and output data of respective ones of said central units by means of their respective I/O memories, and transferring the input and output data between said matching unit and each of said I/O memories in response to the timing signals of said I/O copier.

2. The method according to claim 1, wherein said matching unit includes an input multiplexer, each I/O memory has a set of memory sections, and wherein said step of transferring includes copying the input data from said multiplexer to predetermined sections of each of said I/O memories simultaneously, and copying an output data block of each central unit to predetermined sections of all of said I/O memories simultaneously, each of said predetermined sections being associated with a corresponding one of said central units.

3. The method according to claim 2, wherein each of said copying steps is carried out independently of operation of the central units.

4. The method according to claim 2, wherein in each I/O memory said address generation means includes an address counter driven by clock pulses of said copier, and wherein each of said copying steps includes a step of addressing an I/O memory and a step of synchronizing an address counter by said copier.

5. The method according to claim 1, wherein said step of transferring data is accomplished without interruption of system operation.

6. The method according to claim 1, wherein said data bus has a plurality of lines and said transferring of data between the matching unit and the I/O memories is performed in series mode along individual lines of said bus.

7. Apparatus for communicating input and output data with a processor system having at least one central unit with local memory, comprising: a single data matching unit for coupling data between said system and a site external thereto, at least one I/O memory of which individual ones are associated with each central unit, local bus means connecting each I/O memory to its respective central unit, an I/O copier providing timing and control signals, and a main bus connected between said copier and said data matching unit and each of said I/O memories; and wherein each I/O memory includes individual sections designated for storage of data of corresponding ones of said at least one central unit; both input and output data being transferred simultaneously between said matching unit and memory sections in each of said I/O memories, and between individual ones of said at least one central unit and memory sections in respective ones of said I/O memories in response to timing signals of said copier.

8. Apparatus according to claim 7 wherein a timing of said matching unit is separate from a timing of each of said at least one central unit.

9. A system for communicating input and output data between a set of central data processing units and a remote site, each of which may have its own computer and memory, said system comprising:

a plurality of input/output (I/O) memories connected with respective ones of said central units;

a matching means incorporating a multiplexer and a memory for receiving and transmitting said input and said output data during communication of such data between said system and the remote site;

a data transfer bus connecting each of said I/O memories to said matching means; and copying means for providing timing signals, including clock and synchronization signals, to each of said I/O memories and to said matching means to enable the simultaneous transfer of data between said matching means and each of said I/O memories, each of said I/O memories having a set of predesignated memory sections corresponding to each said central units for storage of data of corresponding ones of said central units thereby permitting communication of data among respective ones of said central units.

10. A system according to claim 9 wherein said matching means comprises an address counter driven by timing signals of said copying means for addressing said memory of said matching means for storing data to be outputted from said central units.

11. A system according to claim 10 wherein each of said I/O memories comprises a random-access memory (RAM), a buffer storage unit, and an address counter driven by timing signals of said copying means for addressing said RAM in the storing of incoming and outgoing data, said buffer storage unit being coupled between said RAM and said bus to permit individual accessing of respective ones of said I/O memories for communication of data of said central units along said bus.

12. A system according to claim 11 wherein said matching means comprises a buffer storage unit coupled between said bus and said multiplexer and said memory of said matching means for formatting a serial transmission of data along said bus from said multiplexer to individual ones of said I/O memories and for receiving sequentially data from respective ones of said I/O memories to load into said memory of said matching means for subsequent outputting from said system.

13. A system according to claim 12 wherein each of said I/O memories and said memory of said matching means is partitioned according to a common format which provides for a specific section reserved for data relevant to a specific one of said central units, and wherein:

addresses of the address counter of said matching means and said I/O memories are provided cyclically, independently of the destinations of data transferred along said bus.

* * * * *